(12) United States Patent
Ren (10) Patent No.: US 11,873,956 B1
(45) Date of Patent: Jan. 16, 2024

(54) SMART MULTI-COLOR LIGHT DIMMING LED CHIP MODULE, BULB, AND LIGHT STRING

(71) Applicant: JIANGMEN CITY SHENGDA LIGHTING CO., LTD., Jiangmen (CN)

(72) Inventor: Juhui Ren, Dongguan (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/328,791

(22) Filed: Jun. 5, 2023

(30) Foreign Application Priority Data

Jun. 22, 2022 (CN) .......................... 202221580101.7

(51) Int. Cl.
| | |
|---|---|
| *F21S 4/10* | (2016.01) |
| *F21V 23/00* | (2015.01) |
| *F21V 23/06* | (2006.01) |
| *F21K 9/237* | (2016.01) |
| *F21Y 103/00* | (2016.01) |
| *F21Y 115/10* | (2016.01) |
| *F21Y 113/13* | (2016.01) |

(52) U.S. Cl.
CPC ................ *F21S 4/10* (2016.01); *F21K 9/237* (2016.08); *F21V 23/003* (2013.01); *F21V 23/06* (2013.01); *F21Y 2103/00* (2013.01); *F21Y 2113/13* (2016.08); *F21Y 2115/10* (2016.08)

(58) Field of Classification Search
CPC .......... F21S 4/10; F21K 9/237; F21V 23/003; F21V 23/06; F21Y 2113/13; F21Y 2115/10; F21Y 2103/00
See application file for complete search history.

(56) References Cited

U.S. PATENT DOCUMENTS

2016/0258580 A1* 9/2016 Sun ........................ F21K 9/232
2019/0063702 A1* 2/2019 Miskin .................... F21V 23/06

FOREIGN PATENT DOCUMENTS

CN 108870116 A * 11/2018

* cited by examiner

*Primary Examiner* — Mary Ellen Bowman (57) ABSTRACT

A smart multi-color light dimming LED chip module, a bulb, and a light string are provided. The smart multi-color light dimming LED chip module includes a transparent circuit board, a control integrated circuit (IC), four metal terminals, at least three light-emitting chips of different colors. The control IC is disposed on the transparent circuit board, and the at least three light-emitting chips are uniformly disposed at a first side of the control IC on the transparent circuit board. The four metal terminals are disposed at a second side of the control IC on the transparent circuit board, the four metal terminals are respectively and electrically connected to a power supply pin, a ground pin, a signal input pin, and a signal output pin of the control IC. A conductive pattern is disposed on each of at least two circuit layers of the transparent circuit board.

9 Claims, 10 Drawing Sheets

FIG. 12

SMART MULTI-COLOR LIGHT DIMMING LED CHIP MODULE, BULB, AND LIGHT STRING

TECHNICAL FIELD

The present disclosure relates to a technical field of LED bulbs, and in particular to a smart multi-color light dimming LED chip module, a bulb, and a light string.

BACKGROUND

Conventional LED lamps are provided with a surface mounted device (SMD) integrating multiple colors, the SMD is of a 180-degree planar light-emitting structure, so that optical structures, such as a light guiding column, are required for bulbs of a light string to emit lights in 360 degrees. However, there are still problems existing in the conventional LED lamps; first, the LED lamps has disadvantages of being complex in structure, high in product cost, low in light emitting brightness, uneven in lighting levels, not attractive in appearance, etc.; second, current LED lamps may only control and adjust colors and color temperatures, but are unable to perform dynamic transformation, such as marquee lights; third, since light-emitting chips in current light-emitting circuits are connected in series, stability of LED filaments is poor, and the LED filaments may easily be damaged; and fourth, current integrated circuit (IC) chips is relatively close to the light-emitting circuits, when the light-emitting circuits light up, the IC chips are easy to block lights, thereby causing shadows.

Therefore, it is necessary to provide a smart multi-color light dimming LED chip module, a bulb, and a light string, which are low in production costs and are capable of self-emitting in 360 degrees.

SUMMARY

In view of above disadvantages and deficiencies of the prior art, the present disclosure aims to a smart multi-color light dimming LED chip module, a bulb, and a light string to solve technical problems that current LED filaments are complex in structure, high in production cost, and not capable of self-emitting in 360 degrees.

In order to achieve above aims, the present disclosure mainly provides following technical solutions.

In a first aspect, the present disclosure provides a smart multi-color light dimming LED chip module, including a transparent circuit board, a control integrated circuit (IC), four metal terminals, at least three light-emitting chips of different colors. The control IC is disposed on the transparent circuit board, and the at least three light-emitting chips are uniformly disposed at a first side of the control IC on the transparent circuit board. The four metal terminals are disposed at a second side of the control IC on the transparent circuit board, the four metal terminals are respectively and electrically connected to a power supply pin, a ground pin, a signal input pin, and a signal output pin of the control IC. The transparent circuit board includes at least two circuit layers, a conductive pattern is disposed on each of the at least two circuit layers, and the conductive pattern is configured to electrically connect each of the at least three light-emitting chips to the power supply pin, the ground pin, the signal input pin, and the signal output pin of the control IC.

Furthermore, the at least three light-emitting chips include a plurality of red light chips, a plurality of blue light chips, a plurality of green light chips, and a plurality of white light chips. The plurality of the red light chips, the plurality of the blue light chips, the plurality of the green light chips, and the plurality of the white light chips are disposed in a staggered manner along a length direction of the transparent circuit board.

Furthermore, a positive pin of each of the plurality of the red light chips is electrically connected to a red light control pin of the control IC, a positive pin of each of the plurality of the blue light chips is electrically connected to a blue light control pin of the control IC, a positive pin of each of the plurality of the green light chips is electrically connected to a green light control pin of the control IC, and a positive pin of each of the plurality of the white light chips is electrically connected to a white light control pin of the control IC. A negative pin of each of the plurality of the red light chips, a negative pin of each of the plurality of the blue light chips, a negative pin of each of the plurality of the green light chips, and a negative pin of each of the plurality of the white light chips are all electrically connected to the ground pin of the control IC. The control IC is a column driver control IC, and the column driver control IC is capable of zonally controlling each of the plurality of the red light chips, each of the plurality of the blue light chips, each of the plurality of the green light chips, and each of the plurality of the white light chips to work along the length direction of the transparent circuit board.

Furthermore, the transparent circuit board is made of materials of glass, sapphire, ceramic, bismaleimide triazine (BT) resin, or FR4 epoxy.

Furthermore, the smart multi-color light dimming LED chip module further includes a control IC protection circuit, and the control IC protection circuit is disposed between the control IC and the four metal terminals for preventing the control IC from being damaged by reverse voltage or pulse current.

Furthermore, the transparent circuit board is divided into a first mounting zone, a second mounting zone, and a third mounting zone along the length direction. A width of the first mounting zone is less than a width of the second mounting zone, and the width of the second mounting zone is less than a width of the third mounting zone. The plurality of the red light chips, the plurality of the blue light chips, the plurality of the green light chips, and the plurality of the white light chips are disposed at the first mounting zone, the control IC is disposed at the second mounting zone, and the four metal terminals are disposed at the third mounting zone.

In a second aspect, the present disclosure provides a bulb, including the smart multi-color light dimming LED chip module, a plastic bracket, and a plastic housing. The smart multi-color light dimming LED chip module is disposed in the plastic housing through the plastic bracket.

In a third aspect, the present disclosure provides a light string, including a plurality of bulbs, a driver, a controller, a plurality of lamp holders, and a plurality of strings. Each of the plurality of the bulbs is the foregoing bulb, the plurality of the lamp holders and the plurality of the strings are disposed in one-to-one correspondence with the plurality of the bulbs. The plurality of the bulbs are inserted into the plurality of the lamp holders in one-to-one correspondence, and the plurality of the lamp holders are electrically connected to the plurality of the strings through the driver and the controller.

Furthermore, four slots are defined on each of the plurality of the lamp holders corresponding to the four metal terminals of each of the plurality of the bulbs, and the four metal terminals are inserted into the four slots in one-to-one correspondence and are electrically connected to each of the plurality of the lamp holders.

Beneficial effects of the present disclosure are as following.

According to the present disclosure, the smart multi-color light dimming LED chip module includes the transparent circuit board, the control IC, the four metal terminals, and the at least three light-emitting chips of different colors. The control IC is disposed on the transparent circuit board, and the at least three light-emitting chips are uniformly disposed at the first side of the control IC on the transparent circuit board. The four metal terminals are disposed at the second side of the control IC on the transparent circuit board, the four metal terminals are respectively and electrically connected to the power supply pin, the ground pin, the signal input pin, and the signal output pin of the control IC. The transparent circuit board includes at least two circuit layers, the conductive pattern is disposed on each of the at least two circuit layers, and the conductive pattern is configured to electrically connect each of the at least three light-emitting chips to the power supply pin, the ground pin, the signal input pin, and the signal output pin of the control IC.

Compared with the prior art, the smart multi-color light dimming LED chip module is simple in structure, low in production costs, and is capable of self-emitting in 360 degrees, moreover, the smart multi-color light dimming LED chip module is even in lighting levels and attractive in appearance.

Reference numerals in the drawings: 1. smart multi-color light dimming LED chip module; 2. transparent circuit board; 3. first mounting zone; 4. second mounting zone; 5. third mounting zone; 6. control integrated circuit; 7. red light chip; 8. blue light chip; 9. green light chip; 10. white light chip; 11. capacitor; 12. resistance; 13. first solder joint; 131. first pad; 132. second pad; 14. second solder joint; 141. third pad; 142. fourth pad; 15. third solder joint; 151. fifth pad; 152. sixth pad; 16. fourth solder joint; 161. seventh pad; 162. eighth pad; 17. blub; 18. plastic housing; 19. plastic bracket; 20. light string; 21. lamp holder; 22. string.

DETAILED DESCRIPTION

In order to better explain the present disclosure for understanding, the present disclosure is described in detail below with reference to accompanying drawings.

First Embodiment

As shown in FIGS. 1-9, the present disclosure provides a smart multi-color light dimming LED chip module, including a transparent circuit board 2, a control integrated circuit (IC) 6, four metal terminals, at least three light-emitting chips of different colors.

Figure 1:
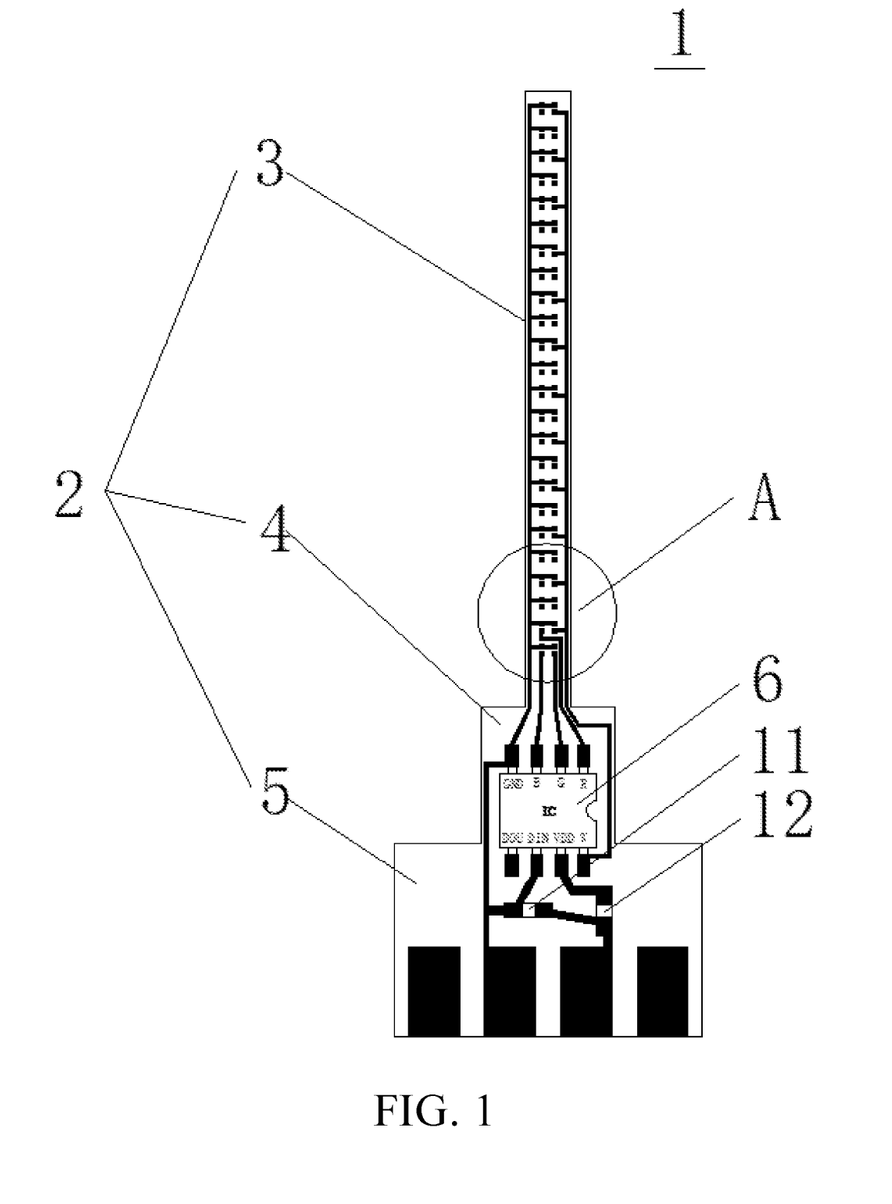
FIG. 1 is a circuit structural schematic diagram of a first circuit layer of a transparent circuit board of a smart multi-color light dimming LED chip module according to a first embodiment of the present disclosure.
Figure 2:
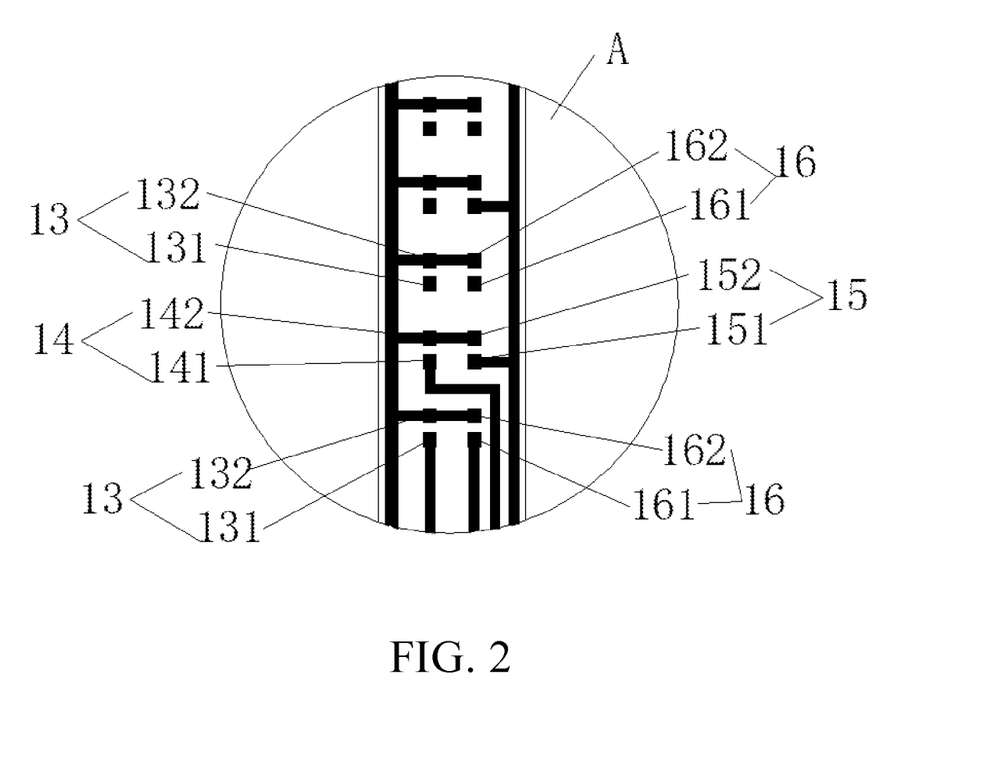
FIG. 2 is a schematic diagram of an enlarged view of the first circuit layer at portion A shown in FIG. 1.

Specifically, please refer to FIG. 1, the control IC 6 includes a red light control pin R, a green light control pin G, a blue light control pin B, a white light control pin 2, a power supply pin VDD, a ground pin GND, a signal input pin DIN, and a signal output pin DOUT.

The control IC 6 is disposed on the transparent circuit board 2, and the at least three light-emitting chips are uniformly disposed at a first side of the control IC 6 on the transparent circuit board 2.

The four metal terminals are disposed at a second side of the control IC 6 on the transparent circuit board 2, the four metal terminals are respectively and electrically connected to the power supply pin VDD, the ground pin GND, the signal input pin DIN, and the signal output pin DOUT of the control IC.

The transparent circuit board 2 includes at least two circuit layers, a conductive pattern is disposed on each of the at least two circuit layers, and the conductive pattern is configured to electrically connect each of the at least three light-emitting chips to the power supply pin VDD, the ground pin GND, the signal input pin DIN, and the signal output pin DOUT of the control IC 6.

Figure 9:
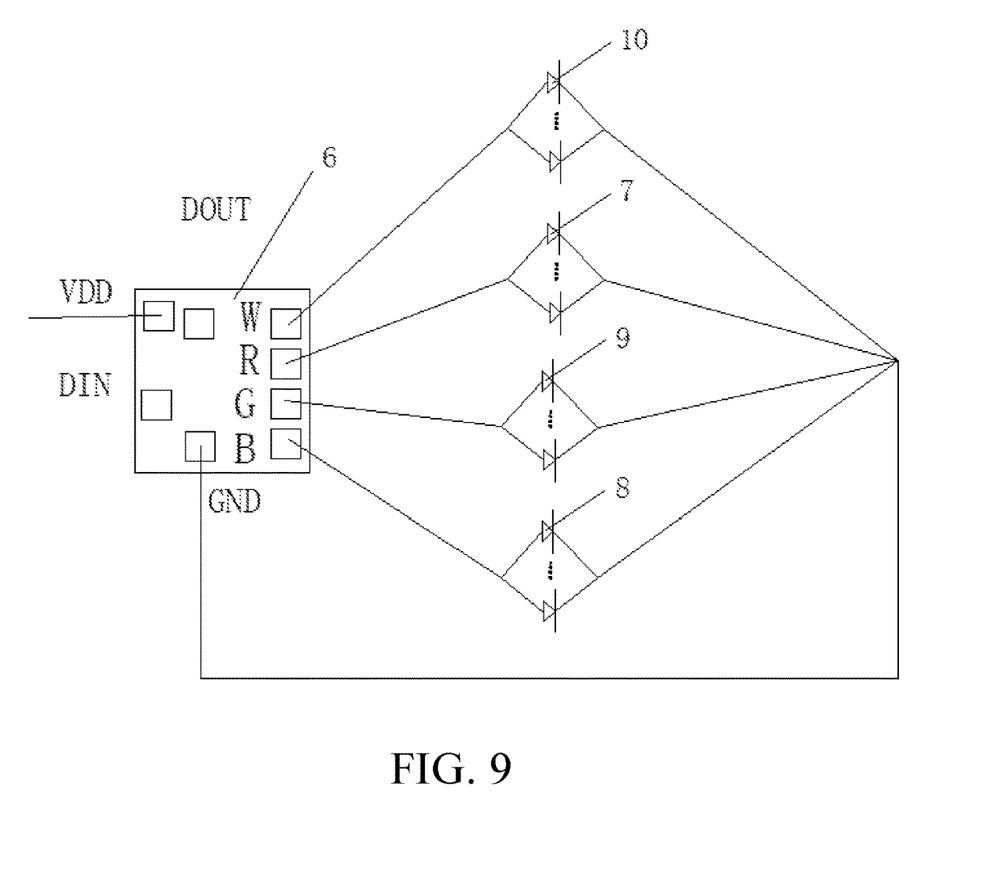
FIG. 9 is a schematic diagram of an electrical connection relationship between the red light chips, the green light chips, the blue light chips, the white light chips with a column driver control integrated circuit (IC) of the smart multi-color light dimming LED chip module according to the first embodiment of the present disclosure.

Please refer to FIG. 9, the at least three light-emitting chips include a plurality of red light chips 7, a plurality of blue light chips 8, a plurality of green light chips 9, and a plurality of white light chips 10. The plurality of the red light chips 7, the plurality of the blue light chips 8, the plurality of the green light chips 9, and the plurality of the white light chips 10 are disposed in a staggered manner along a length direction of the transparent circuit board 2. It should be further noted that the plurality of the red light chips 7, the plurality of the blue light chips 8, the plurality of the green light chips 9, and the plurality of the white light chips 10 may be mutually independent chips, or may be integrated chips.

A positive pin of each of the plurality of the red light chips 7 is electrically connected to a red light control pin R, a positive pin of each of the plurality of the blue light chips 8 is electrically connected to a blue light control pin B, a positive pin of each of the plurality of the green light chips 9 is electrically connected to a green light control pin G, and a positive pin of each of the plurality of the white light chips 10 is electrically connected to a white light control pin W. A negative pin of each of the plurality of the red light chips 7, a negative pin of each of the plurality of the blue light chips 8, a negative pin of each of the plurality of the green light chips 9, and a negative pin of each of the plurality of the white light chips 10 are all electrically connected to the ground pin GND.

Specifically, the control IC 6 may be a column driver control IC for a display screen, the column driver control IC is capable of independently and zonally controlling each of the at least three light-emitting chips to light up or turn out along the length direction of the transparent circuit board 2, so that the at least three light-emitting chips perform dynamic transformation along the length direction of the transparent circuit board 2 to achieve a display effect of marquee lights.

According to the present disclosure and compared with the prior art, the smart multi-color light dimming LED chip module is simple in structure, low in production costs, capable of self-emitting in 360 degrees, even in lighting levels, and attractive in appearance. Moreover, the plurality of the red light chips, the plurality of the green light chips, the plurality of the blue light chips, and the plurality of the white light chips are connected in parallel, so that stability and reliability of the smart multi-color light dimming LED chip module are better, and the smart multi-color light dimming LED chip module is still be available when a single light-emitting chip is damaged. Meanwhile, since the control IC 6 is the column driver control IC, the control IC 6 is capable of controlling the plurality of the red light chips, the plurality of the green light chips, the plurality of the blue light chips, and the plurality of the white light chips to perform dynamic transformation along the length direction of the transparent circuit board 2, so as to achieve the display effect of the marquee lights. In addition, the smart multi-color light dimming LED chip module is capable of emitting five kinds of light, including red light, green light, blue light, white light, and another white light formed by simultaneously lighting up the red light, the green light, the blue light, and the white light.

Furthermore, the four metal terminals at the second side of the control IC 6 on the transparent circuit board 2 are respective a VDD metal terminal, a GND metal terminal, a DIN metal terminal, and a DOUT metal terminal. Specifically, the VDD metal terminal is configured to connect with a positive electrode of a power supply, the GND metal terminal is configured to connect a negative electrode of the power supply, the DIN metal terminal is configured to receive a control signal, and the DOUT metal terminal is configured to send the control signal to a next smart multi-color light dimming LED chip module.

Figure 3:
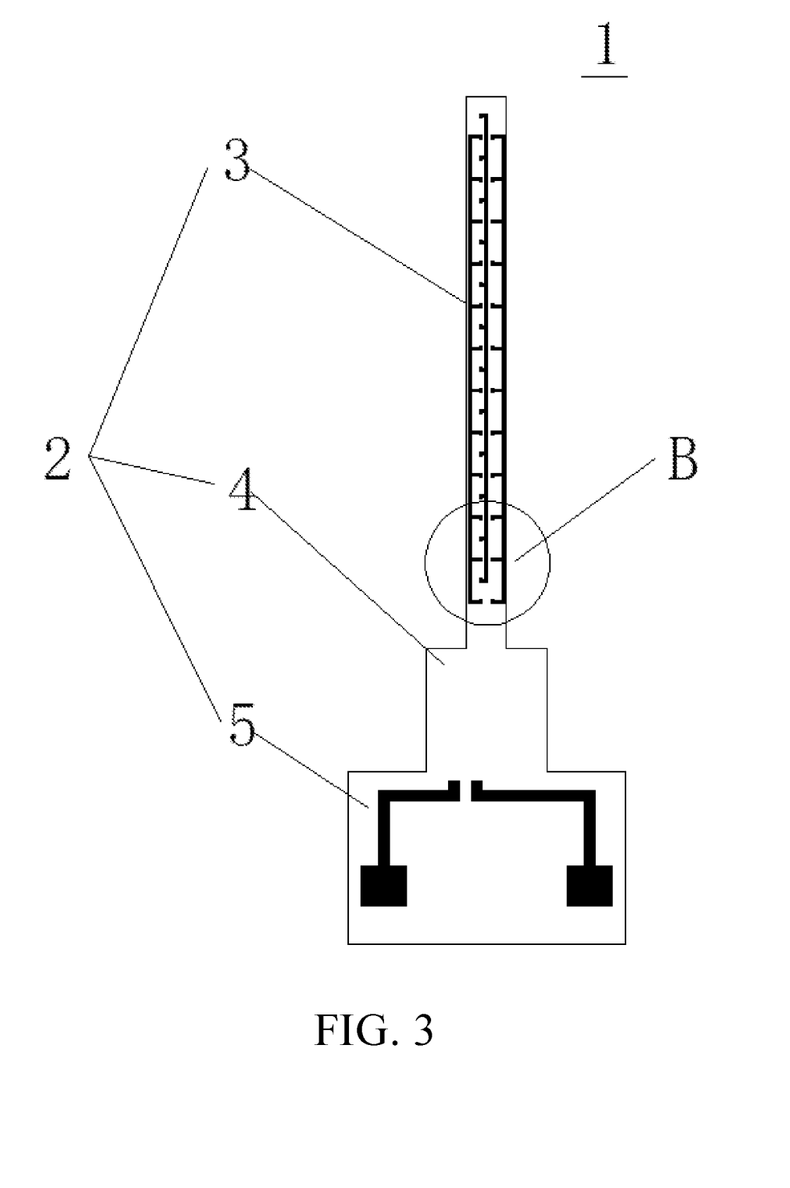
FIG. 3 is a circuit structural schematic diagram of a second circuit layer of the transparent circuit board of the smart multi-color light dimming LED chip module according to the first embodiment of the present disclosure.
Figure 4:
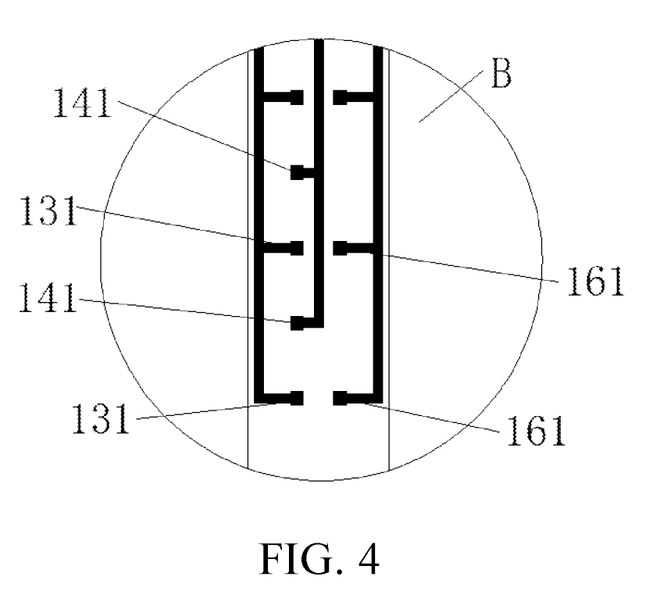
FIG. 4 is a schematic diagram of an enlarged view of the second circuit layer at portion B shown in FIG. 3.
Figure 5:
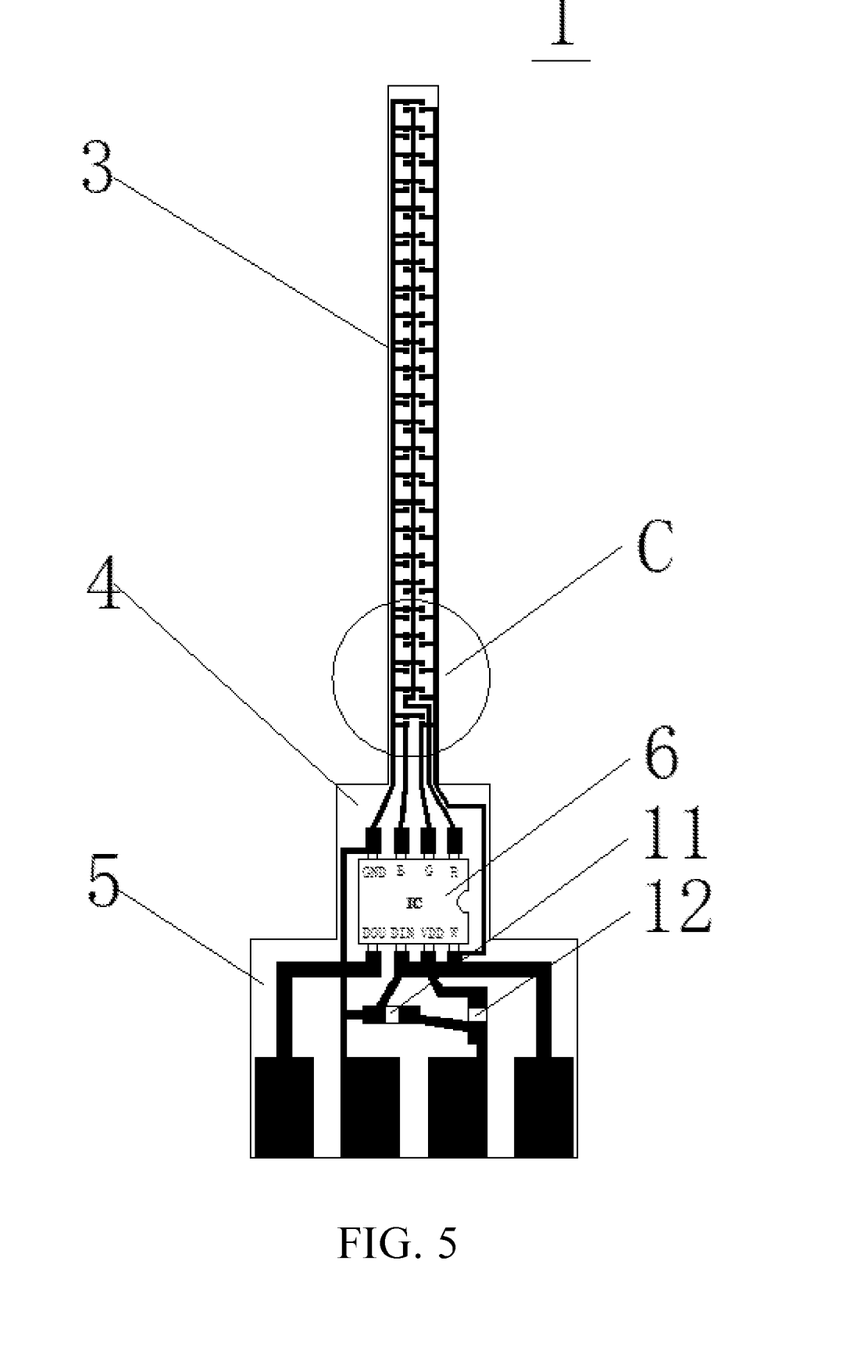
FIG. 5 is a circuit structural schematic diagram of the transparent circuit board of the smart multi-color light dimming LED chip module according to the first embodiment of the present disclosure where the transparent circuit board is formed by stacking the first circuit layer and the second circuit layer.
Figure 6:
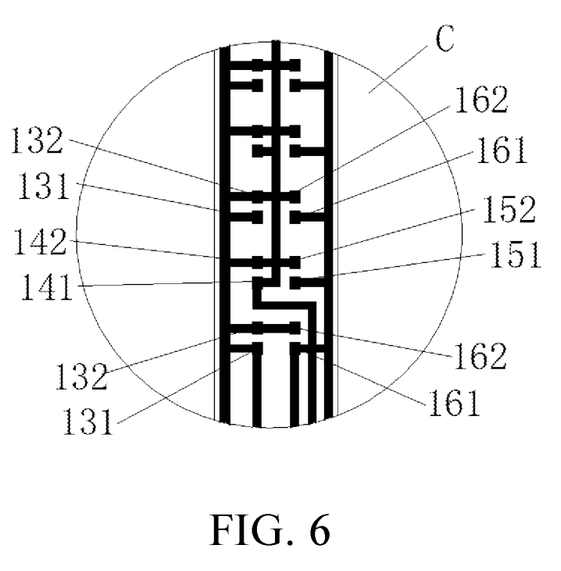
FIG. 6 is a schematic diagram of an enlarged view the transparent circuit board at portion C shown in FIG. 5.

Furthermore, please refer to FIGS. 1, 3, and 5, the transparent circuit board 2 is formed by stacking a first circuit layer and a second circuit layer, the first circuit layer includes a plurality of first solder joints 13, a plurality of second solder joints 14, a plurality of third solder joints 15, and a plurality of fourth solder joints 16 disposed at intervals along a length direction, the plurality of the first solder joints 13 are connected in parallel, the plurality of the second solder joints 14 are connected in parallel, the plurality of the third solder joints 15 are connected in parallel, and the plurality of the fourth solder joints 16 are connected in parallel. The plurality of the first solder joints 13 and the plurality of the second solder joints 14 are located in the same column and are staggered, the plurality of the third solder joints 15 and the plurality of the fourth solder joints 16 are located in the same column and are staggered. Therefore, after the at least three light-emitting chips are welded to the solder joints in one-to-one correspondence, different light-emitting chips are arranged in a matrix type, and a pixel point is formed by one red light chip 7, one blue light chip 8, one green light chip 9, and one white light chip in one matrix. In addition, a surface of each of the at least three light-emitting chips is coated with a layer of diffusion white glue, so that there is none of spots, dark areas, and light spots when the at least three light-emitting chips light up. Furthermore, the transparent circuit board is preferably made of materials of glass, sapphire, ceramic, bismaleimide triazine (BT) resin, or FR4 epoxy.

Figure 7:
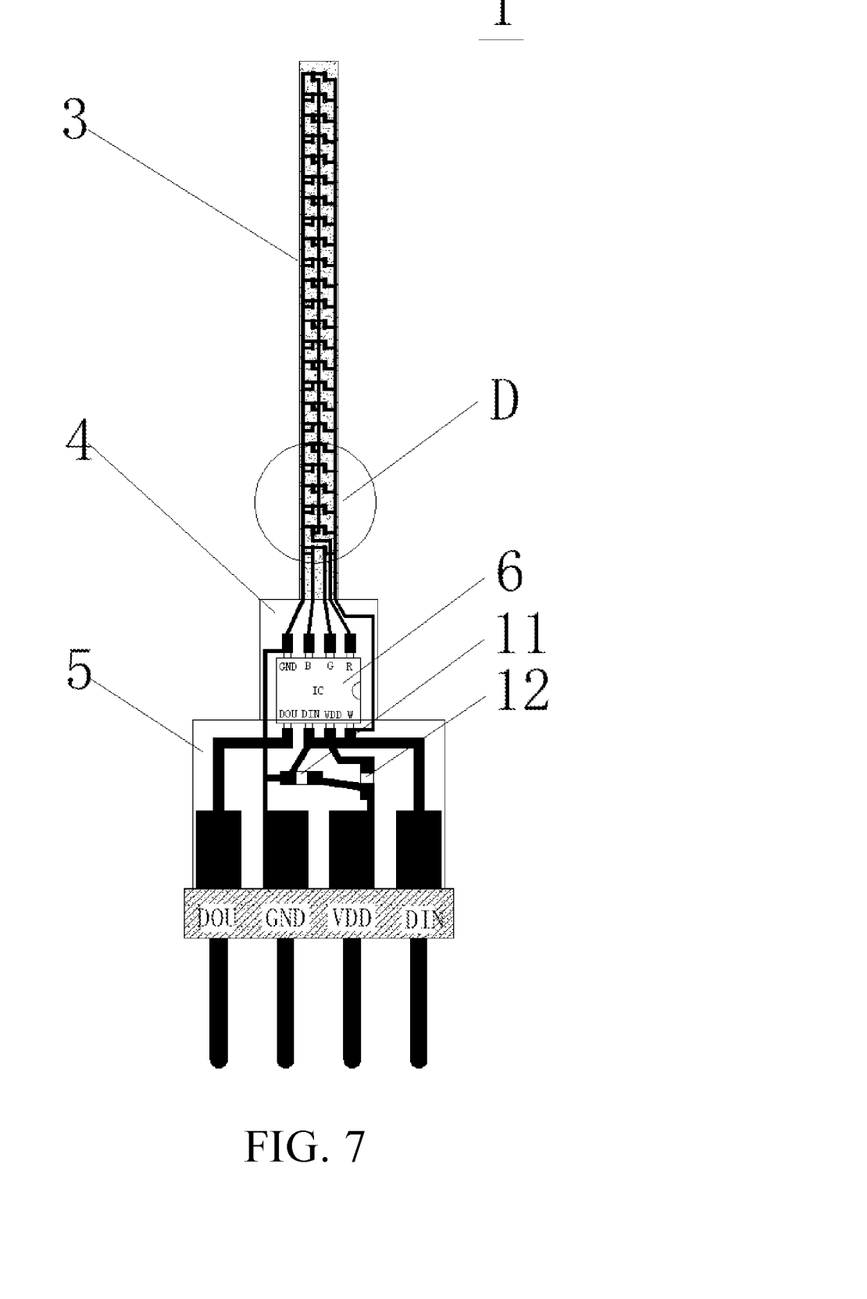
FIG. 7 is another circuit structural schematic diagram of the transparent circuit board of the smart multi-color light dimming LED chip module according to the first embodiment of the present disclosure where red light chips, green light chips, blue light chips, and white light chips are disposed on the transparent circuit board.
Figure 8:
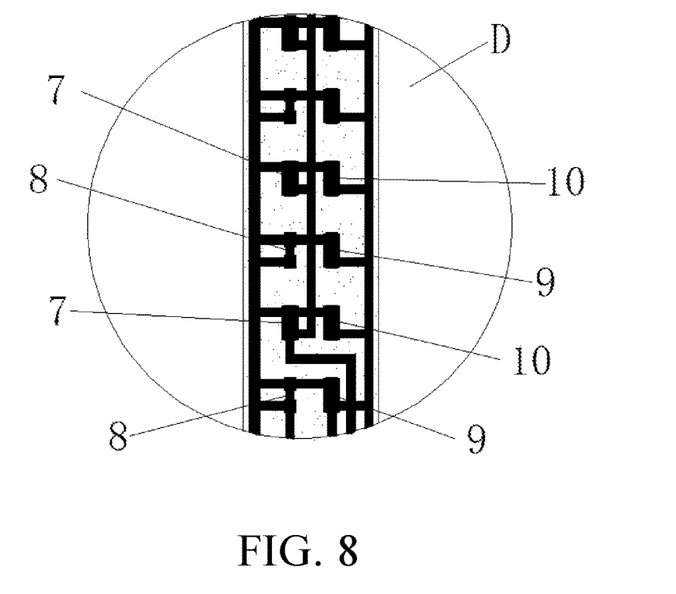
FIG. 8 is a schematic diagram of an enlarged view of the transparent circuit board at portion D shown in FIG. 7.

Specifically, please refer to FIGS. 7 and 8, each of the plurality of the first solder joints 13 includes a first pad 131 and a second pad 132 for respectively welding with a positive pin and a negative pin of each of the plurality of the blue light chips 8. Please refer to FIGS. 1 and 2, the first pad 131 of a first one of the plurality of the first solder joints 13 is electrically connected to the blue light control pin B of the control IC 6 through a first conductive pattern on the first circuit layer along a direction distal from the control IC 6. Moreover, please refer to FIGS. 3 and 4, the first pad 131 of each of the plurality of the first solder joints 13 is electrically connected to a next first pad 131 of a next first solder joint 13 through a second conductive pattern on the second circuit layer, and please refer to FIGS. 1 and 2, the second pad 132 of each of plurality of the first solder joints 13 is electrically connected to the ground pin GND of the control IC 6 through the first conductive pattern on the first circuit layer.

Please refer to FIGS. 7 and 8, each of the plurality of the second solder joints 14 includes a third pad 141 and a fourth pad 142 for respectively welding with a positive pin and a negative pin of each of the plurality of the red light chips 7. Please refer to FIGS. 1 and 2, the third pad 141 of a first one of the plurality of the second solder joints 14 is electrically connected to the red light control pin R of the control IC 6 through the first conductive pattern on the first circuit layer along the direction distal from the control IC 6. Moreover, please refer to FIGS. 3 and 4, the third pad 141 of each of the plurality of the second solder joints 14 is electrically connected to a next third pad 141 of a next second solder joint 14 through the second conductive pattern on the second circuit layer, and please refer to FIGS. 1 and 2, the fourth pad 142 of each of plurality of the second solder joints 14 is electrically connected to the ground pin GND of the control IC 6 through the first conductive pattern on the first circuit layer.

Please refer to FIGS. 7 and 8, each of the plurality of the third solder joints 15 includes a fifth pad 151 and a sixth pad 152 for respectively welding with a positive pin and a negative pin of each of the plurality of the white light chips 10. Please refer to FIGS. 1 and 2, the fifth pad 151 of each of the plurality of the third solder joints 15 is electrically connected to the white light control pin W of the control IC 6 through the first conductive pattern on the first circuit layer, and the sixth pad 152 of each of plurality of the third solder joints 15 is electrically connected to the ground pin GND of the control IC 6 through the first conductive pattern on the first circuit layer.

Each of the plurality of the fourth solder joints 16 includes a seventh pad 161 and an eighth pad 162 for respectively welding with a positive pin and a negative pin of each of the plurality of the green light chips 9. Please refer to FIGS. 1 and 2, the seventh pad 161 of a first one of the plurality of the fourth solder joints 16 is electrically connected to the green light control pin G of the control IC 6 through the first conductive pattern on the first circuit layer along the direction distal from the control IC 6. Moreover, please refer to FIGS. 3 and 4, the seventh pad 161 of each of the plurality of the fourth solder joints 16 is electrically connected to a next seventh pad 161 of a next fourth solder joint 16 through the second conductive pattern on the second circuit layer, and please refer to FIGS. 1 and 2, the eighth pad 162 of each of plurality of the fourth solder joints 16 is electrically connected to the ground pin GND of the control IC 6 through the first conductive pattern on the first circuit layer.

The transparent circuit board 2 is formed by stacking the first circuit layer and the second circuit layer, and the first circuit layer communicates with the second circuit layer, so that the plurality of the red light chips 7, the plurality of the blue light chips 8, the plurality of the green light chips 9, and the plurality of the white light chips are arranged in parallel to successfully complete wire arrangement. The control IC 6 is capable of independently and zonally controlling each of the at least three light-emitting chips to light up or turn out along the length direction of the transparent circuit board 2, thereby performing dynamic transformation.

Please refer to FIG. 1, the smart multi-color light dimming LED chip module further includes the control IC protection circuit, the control IC protection circuit includes a capacitor 11 and a resistor 12. A first end of the capacitor 11 is electrically connected to the power supply pin VDD, and a second end of the capacitor 11 is respectively connected to the ground pin GND and the signal input pin DIN of the control IC 6. A first end of the resistor 12 is electrically connected to the power supply pin VDD, and a second end of the resistor 12 is electrically connected to the power supply pin VDD. The capacitor 11 and the resistor 13 are provided for preventing the control IC 6 from being damaged by reverse voltage or pulse current.

Please refer to FIGS. 1, 3, 5, and 7, the transparent circuit board 2 is divided into a first mounting zone 3, a second mounting zone 4, and a third mounting zone 5 along the length direction. A width of the first mounting zone 3 is less than a width of the second mounting zone 4, and the width of the second mounting zone 4 is less than a width of the third mounting zone 5.

The plurality of the red light chips 7, the plurality of the blue light chips 8, the plurality of the green light chips 9, and the plurality of the white light chips 10 are disposed at the first mounting zone 3, the control IC 6 is disposed at the second mounting zone 4, and the VDD metal terminal, the GND metal terminal, the DIN metal terminal, and the DOUT metal terminal are disposed at the third mounting zone 5. According to this structure, distances from the control IC 6 to the plurality of the red light chips 7, the plurality of the blue light chips 8, the plurality of the green light chips 9, and the plurality of the white light chips 10 are relatively large, and when the plurality of the red light chips 7, the plurality of the blue light chips 8, the plurality of the green light chips 9, and the plurality of the white light chips 10 emit lights, the control IC 6 may not shield the lights to cause shadows.

Second Embodiment

Figure 10:
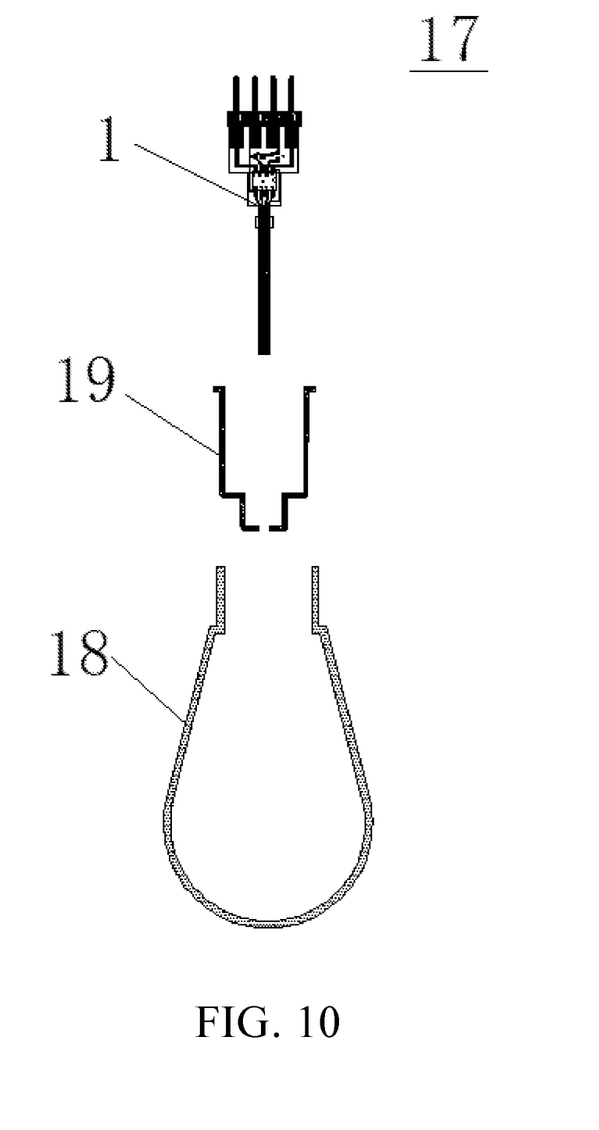
FIG. 10 is an exploded schematic diagram of a bulb using the foregoing smart multi-color light dimming LED chip module according a second embodiment of the present disclosure.

On a basis of the first embodiment, the second embodiment of the present disclosure provides a bulb, as shown in FIG. 10, the bulb 17 includes the smart multi-color light dimming LED chip module 1, a plastic bracket 19, and a plastic housing 18. The smart multi-color light dimming LED chip module 1 is disposed in the plastic housing 18 through the plastic bracket 19.

The bulb 17 of the second embodiment uses the smart multi-color light dimming LED chip module 1 of the first embodiment, which is low in costs, capable of self-emitting in 360 degrees, even in lighting levels, and attractive in appearance. Meanwhile, lights of the smart multi-color light dimming LED chip module 1 in the bulb 17 perform dynamic transformation along the length direction of the transparent circuit board 2, so as to achieve the display effect of the marquee lights.

Third Embodiment

Figure 11:
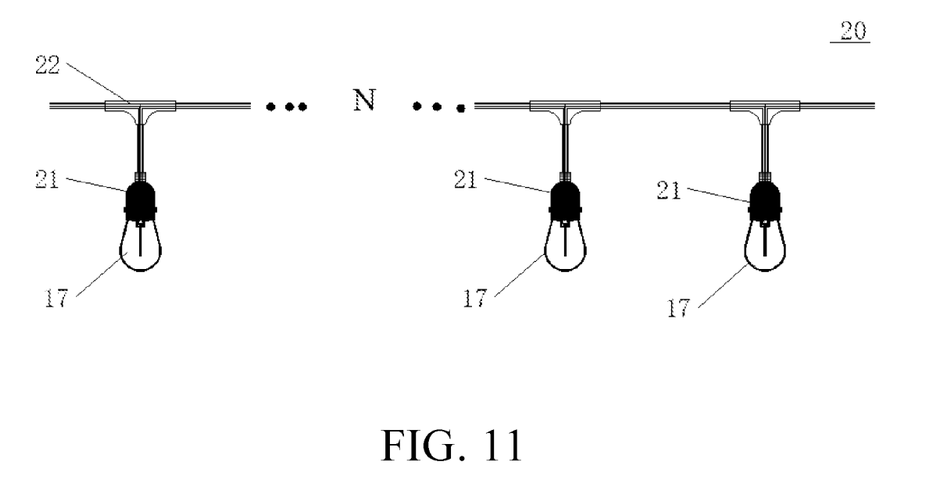
FIG. 11 is a schematic diagram of a light string using the bulb according to a third embodiment of the present disclosure.
Figure 12:
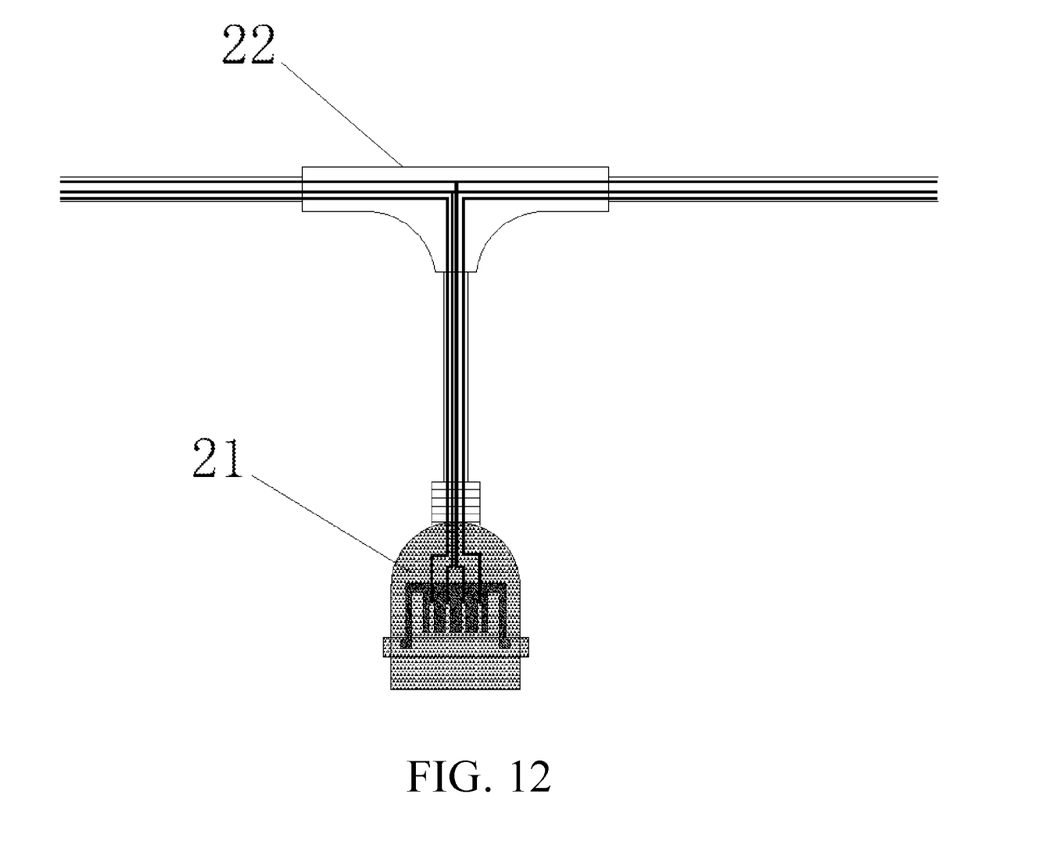
FIG. 12 is a structural schematic diagram of a lamp holder and the light string shown in FIG. 11.

On a basis of the second embodiment, the present disclosure provides alight string, as shown in FIGS. 11 and 12, the light string 20 includes a plurality of bulbs 17, a driver (not shown in the drawings), a controller (not shown in the drawings), a plurality of lamp holders 21, and a plurality of strings 22. Each of the plurality of the bulbs 17 is the foregoing bulb 17 in the second embodiment, the plurality of the lamp holders 21 and the plurality of the strings 22 are disposed in one-to-one correspondence with the plurality of the bulbs 17. The plurality of the bulbs 17 are inserted into the plurality of the lamp holders 21 in one-to-one correspondence, and the plurality of the lamp holders 21 are electrically connected to the plurality of the strings 22 through the driver and the controller, so as to form the light string 20.

In the embodiment, four slots are defined on each of the plurality of the lamp holders 21 corresponding to the four metal terminals of each of the plurality of the bulbs 17, and the four metal terminals are inserted into the four slots in one-to-one correspondence and are electrically connected to each of the plurality of the lamp holders 21.

A positive electrode is electrically connected to a VDD metal terminal of each of the plurality of the bulbs 17, a negative electrode of the driver is electrically connected to a GND metal terminal of each of the plurality of the bulbs 17. A signal output terminal is disposed on the controller, the signal output is electrically connected a DIN metal terminal of a first one of the plurality of the bulbs 17, a DOUT metal terminal of a first one of the plurality of the bulbs 17 is electrically connected to a DIN metal terminal of a next one of the plurality of the bulbs 17, and so on.

In the description of the present disclosure, it should be understood that the terms "first" and "second" are used for descriptive purposes only and cannot be understood as indicating or implying relative importance or implicitly indicating the number of indicated technical features. Thus, the features defined with "first" and "second" may explicitly or implicitly include one or more of the features. In the description of the present disclosure, the meaning of "a plurality of" is two or more, unless specifically defined otherwise.

Although the embodiments of the present disclosure have been shown and described above, it may be understood that the foregoing embodiments are exemplary and cannot be understood as limitations to the present disclosure, and those skilled in the art may make revisions, modifications, substitutions, and variations to the foregoing embodiments within the scope of the present disclosure.

What is claimed is:

1. A smart multi-color light dimming LED chip module, comprising:
a transparent circuit board;
a control integrated circuit (IC);
four metal terminals; and
at least three light-emitting chips of different colors;
wherein the control IC is disposed on the transparent circuit board, and the at least three light-emitting chips are uniformly disposed at a first side of the control IC on the transparent circuit board;
the four metal terminals are disposed at a second side of the control IC on the transparent circuit board, the four metal terminals are respectively and electrically connected to a power supply pin, a ground pin, a signal input pin, and a signal output pin of the control IC; and
the transparent circuit board comprises at least two circuit layers, a conductive pattern is disposed on each of the at least two circuit layers, and the conductive pattern is configured to electrically connect each of the at least three light-emitting chips to the power supply pin, the ground pin, the signal input pin, and the signal output pin of the control IC.

2. The smart multi-color light dimming LED chip module according to claim 1, wherein the at least three light-emitting chips comprise a plurality of red light chips, a plurality of blue light chips, a plurality of green light chips, and a plurality of white light chips; and
the plurality of the red light chips, the plurality of the blue light chips, the plurality of the green light chips, and the plurality of the white light chips are disposed in a staggered manner along a length direction of the transparent circuit board.

3. The smart multi-color light dimming LED chip module according to claim 2, wherein a positive pin of each of the plurality of the red light chips is electrically connected to a red light control pin of the control IC, a positive pin of each of the plurality of the blue light chips is electrically connected to a blue light control pin of the control IC, a positive pin of each of the plurality of the green light chips is electrically connected to a green light control pin of the control IC, and a positive pin of each of the plurality of the white light chips is electrically connected to a white light control pin of the control IC; a negative pin of each of the plurality of the red light chips, a negative pin of each of the plurality of the blue light chips, a negative pin of each of the plurality of the green light chips, and a negative pin of each of the plurality of the white light chips are all electrically connected to the ground pin of the control IC; and
the control IC is a column driver control IC, and the column driver control IC is capable of zonally controlling each of the plurality of the red light chips, each of the plurality of the blue light chips, each of the plurality of the green light chips, and each of the plurality of the white light chips to work along the length direction of the transparent circuit board.

4. The smart multi-color light dimming LED chip module according to claim 1, wherein the transparent circuit board is made of materials of glass, sapphire, ceramic, bismaleimide triazine (BT) resin, or FR4 epoxy.

5. The smart multi-color light dimming LED chip module according to claim 1, wherein the smart multi-color light dimming LED chip module further comprises a control IC protection circuit, and the control IC protection circuit is disposed between the control IC and the four metal terminals for preventing the control IC from being damaged by reverse voltage or pulse current.

6. The smart multi-color light dimming LED chip module according to claim 2, wherein the transparent circuit board is divided into a first mounting zone, a second mounting zone, and a third mounting zone along the length direction; a width of the first mounting zone is less than a width of the second mounting zone, and the width of the second mounting zone is less than a width of the third mounting zone; and
the plurality of the red light chips, the plurality of the blue light chips, the plurality of the green light chips, and the plurality of the white light chips are disposed at the first mounting zone, the control IC is disposed at the second mounting zone, and the four metal terminals are disposed at the third mounting zone.

7. A bulb, comprising:
the smart multi-color light dimming LED chip module according to claim 1;
a plastic bracket; and
a plastic housing;
wherein the smart multi-color light dimming LED chip module is disposed in the plastic housing through the plastic bracket.

8. A light string, comprising:
a plurality of bulbs;
a driver;
a controller;
a plurality of lamp holders; and
a plurality of strings;
wherein each of the plurality of the bulbs is the bulb according to claim 7, the plurality of the lamp holders and the plurality of the strings are disposed in one-to-one correspondence with the plurality of the bulbs; the plurality of the bulbs are inserted into the plurality of the lamp holders in one-to-one correspondence, and the plurality of the lamp holders are electrically connected to the plurality of the strings through the driver and the controller.

9. The light string according to claim 8, wherein four slots are defined on each of the plurality of the lamp holders corresponding to the four metal terminals of each of the plurality of the bulbs, and the four metal terminals are inserted into the four slots in one-to-one correspondence and are electrically connected to each of the plurality of the lamp holders.

* * * * *